Oct. 19, 1943.  W. R. DRESSER  2,332,308
METHOD AND APPARATUS FOR INSPECTING PLASTIC MOLDED
ARTICLES, SUCH AS BUTTONS OR THE LIKE
Filed May 2, 1941  2 Sheets-Sheet 1
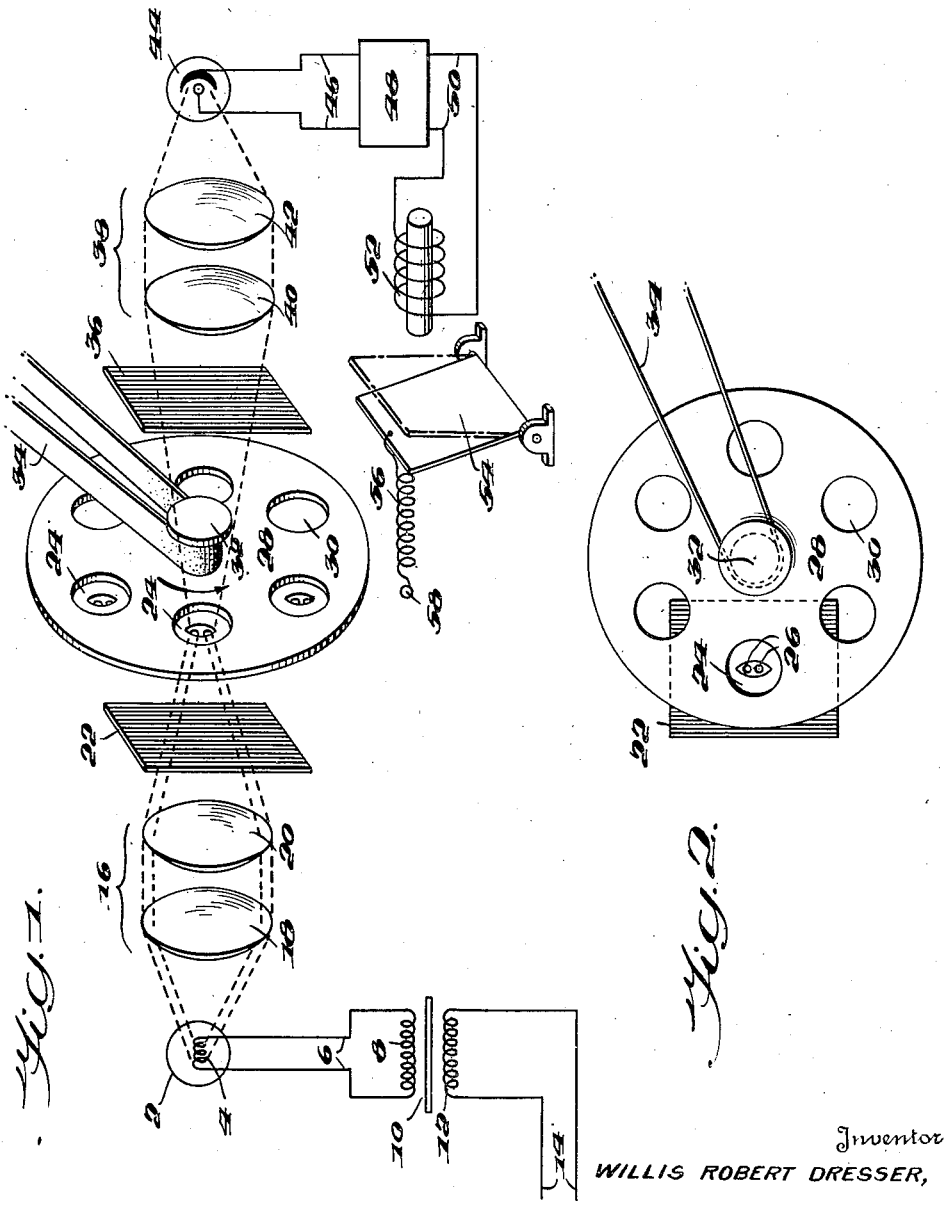
Inventor
WILLIS ROBERT DRESSER,
By Robert B. Pearson
Attorney

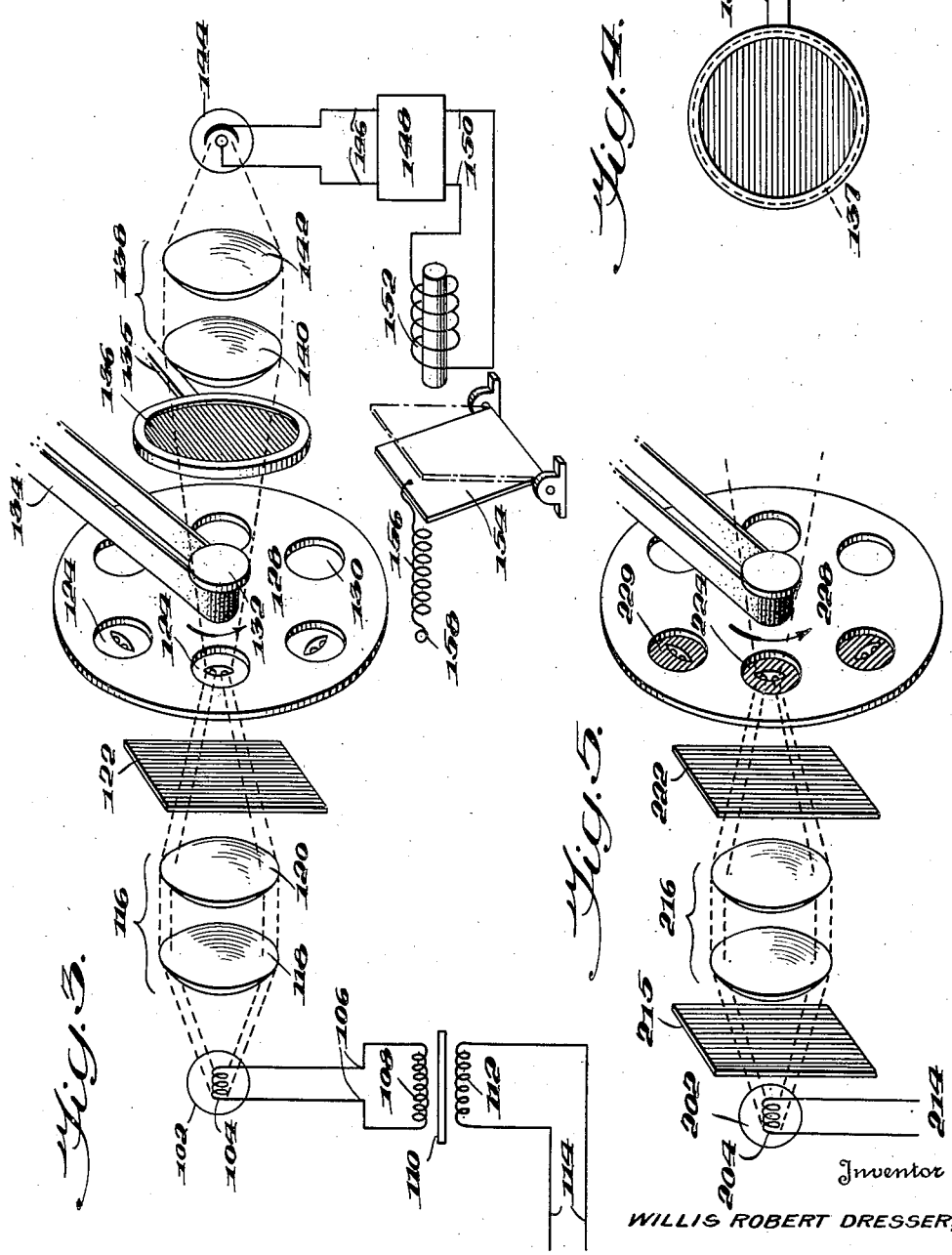

Patented Oct. 19, 1943

2,332,308

UNITED STATES PATENT OFFICE 2,332,308

METHOD AND APPARATUS FOR INSPECTING PLASTIC MOLDED ARTICLES, SUCH AS BUTTONS OR THE LIKE

Willis Robert Dresser, Trumbull, Conn., assignor to The Patent Button Company, Waterbury, Conn.

Application May 2, 1941, Serial No. 391,592

10 Claims. (Cl. 209—111)

This invention relates to a method and apparatus for inspecting plastic moldings. Particularly, the invention comprises the provision for photoelectric means and light polarizing means to inspect molded buttons for blocked thread holes and other similar applications.

In the manufacture of certain moldings it sometimes happens that the holes that were to have been molded therein are blocked by a web or flash of the molding material. When, as for example, the thread holes, or eyes, of molded buttons are found to be thus blocked, they are generally fed to eye-piercing machines. This invention comprises a method and apparatus of preselecting the buttons to be subjected to the eye-piercing operation.

While photoelectric methods of inspection, wherein plastic moldings, or molded buttons are passed between a source of light and a photoelectric cell connected with sorting mechanism to sort the moldings in accordance with the differences of light passed through certain required openings in the moldings previously have been used, it has been found that in inspecting translucent moldings, especially molded buttons, the difference in the amount of light transmitted by a perfect translucent button and one having a thin web of nearly transparent flash in one or more of the eyes or holes is not sufficient to cause selective operation of the sorting machine. Accordingly, it is an object of this invention to provide a photoelectric inspecting system utilizing plano-polarized light derived from a non-diffused source of light, wherein diffusion of the light by the web of "flash" in the eye, or eyes, or hole or holes of a button or molding, even though the body of the button or molding be white or highly translucent, causes sorting of the button or molding. By utilizing the contrast between diffused light and plano-polarized light it is further proposed to provide an automatic, continuous system responsive even to partial blocking of the eyes or holes wherein only a slight bit of "flash" is left across the eye or hole or wherein the eyes or holes are oval or off-center. In keeping with the broader objectives of the invention, either spectral or monochromatic light may accordingly be used.

Still another proposal is to provide, in one refinement of the system, a source of monochromatic light, or a source of monochromatic light in conjunction with polarizing apparatus, to increase the selectivity in inspecting buttons or moldings of colors differing from the color of the monochromatic light.

It is also an object to utilize band-pass color filters when the light emitted from the source is spectral, in conjunction with a polarizing system, for increasing selectivity when inspecting colored buttons or moldings.

These and other objectives will be apparent from the following specification and drawings, in which:

Fig. 1 is a diagram showing the salient, component parts of the system in their relative positions;

Fig. 2 shows a detail of the button positioning disc and first polarizing screen;

Fig. 3 is a diagram showing the relative positions of the parts according to a second system and method;

Fig. 4 shows a detail of the second polarizing screen used in the method employing the Fig. 3 system; and Fig. 5 diagrammatically illustrates a third embodiment of the invention.

The apparatus for executing the method is illustrated in Fig. 1, in which the reference numeral 2 designates a source of light; in this instance, that which emanates from the heated filament 4. In accordance with the usual practice, the leads 6 of the filament are connected to the secondary winding 8 of a transformer 10, the primary winding 12 of which is connected to a suitable source of current indicated by the reference numeral 14.

In order to direct the light so that a molding, or molded button, will intercept the rays thereof, a condensing system 16, comprising the collimating lenses 18 and 20, directs the rays of light through a polarizing screen 22. In this instance, the polarizing screen is so disposed as to transmit only those light rays which are polarized in the vertical plane.

The moldings to be inspected indicated by the reference numeral 24, are molded buttons having eyes 26, as best shown in Fig. 2. A disc 28, continuously rotating in the direction indicated by the arrow, has a plurality of openings 30 into which the moldings are placed by suitable mechanism, not shown; the disc being supported on shaft 32 and driven by belt 34 which, in turn, is connected to a driving mechanism. The body of the disc is preferably impervious to light so that only the light passing through the moldings will emanate from the right-hand side of the disc. Rotation of the disc 28 brings each molding 24 directly across the path of the rays of vertically polarized light. After the moldings have been passed across the rays of light, they are ejected from the holes by ejecting mechanism (not shown) and are passed to selector 54, described below.

When the light has passed through the molding, or through the eyes of a molded button, it passes through a second polarizing screen 36 which also transmits light rays vibrating in a vertical plane only.

A second collimating system 38, comprising condensing lenses 40 and 42, is interposed and so arranged as to focus light passing through the eyes of the button and the polarizing screen 36 on the photoelectric cell 44. The leads 46 of the photoelectric cell being connected to a relay 48 which, as shown at 50, electrically actuates the magnet 52 which, when energized, moves a selector 54.

Selector 54 is movable between two positions, the first position, shown in full lines, being for guiding normal buttons to one receptacle, the second, dotted-line, position being for guiding imperfect buttons to another receptacle. As shown in the drawings, selector 54 is normally retained in its full line position by spring 56 anchored at 58.

The operation of the Fig. 1 system and method is as follows:

As the buttons 24 are moved across the path of the rays of polarized light, the light passing through the eyes of the buttons, if the eyes are open, will remain vertically polarized and will therefore pass through the second polarizing screen 36. Photoelectric cell 44, when exposed to a predetermined amount of light from a normal button, will so operate the relay as to hold the selector mechanism in the full-line position. If, however, one or more of the eyes of the buttons are not fully open, even though only a thin film of flashing may block the opening, or openings, the light will be diffused by the flashing so that a relatively small amount of light will remain polarized in the vertical plane, to be passed by the second polarizing screen 36. The relay 48 is so adjusted that the relatively small amount of light, and, in turn, decreased current from photoelectric cell 44, will cause operation of the selector mechanism for rejection of the button.

In testing any given type of button, relay 48 is first set by placing a perfect button in disc 28 and then turning the disc so as to hold the button in the path of the polarized light rays. Then the relay, or associated control, is adjusted so that it will remain inoperative so long as the amount of light transmitted by this, or any other, perfect button impinges on the photoelectric cell. When a less amount of light, as would be passed by an imperfect button, impinges upon the photoelectric cell, the relay places the selector into operation. In this respect, the relay operates as a comparison mechanism. It is obvious that other well-known mechanisms may be used to provide the comparison.

As shown in Fig. 1, the selector 54 is normally held by spring 56 so as to guide perfect buttons into the appropriate channel. Relay 48 is so adjusted that, the decreased current from the photoelectric cell, caused by a reduction in the amount of polarized light transmitted through an imperfect button, by suitable circuit arrangement, causes energization of magnet 52 so as to swing selector 54 to its dotted line position. When the selector is in dotted line position, the buttons falling therepast are guided into a channel for imperfect buttons. It is obvious that the reverse of this system may be arranged.

Whatever arrangement be chosen in this, or the other examples given herein, a suitable time-lag mechanism is incorporated in the relay mechanism to compensate for the difference in time between when a given button intercepts the beam of light and when it is dropped onto the selector.

The system illustrated by Fig. 3 is, for the most part, similar to that previously described in that a source of spectral or monochromatic light 102 having a filament 104, or other light producing means, is connected by leads 106 to the secondary winding 108 of isolating transformer 110, the primary winding 112 of which is connected by leads 114 to a source of suitable current. A collimating system 116 comprising condenser lenses 118 and 120 focuses the light rays through polarizing screen 122 on the path of buttons 124 carried in holes 130 in disc 128. Also, as in the first system, disc 128 is carried by shaft 132 driven by belt 134 in continuous rotation. A second polarizing screen 136 is carried by support 135 for rotational adjustment, as indicated by the dotted lines 137 in Fig. 4, so that it may be rotated to pass light polarized in a vertical, horizontal, or any intermediate plane.

In the Fig. 3 arrangement, however, the polarizing screen 136 is so adjusted as to transmit light rays whose plane of vibration is at right angles to the plane of polarization of screen 122. Such light as is passed by polarizing screen 136 is focused, by lenses 140, 142 of collimating system 138, on to the photoelectric cell 144 connected by leads 146 to relay 148. Relay 148 is connected by leads 150 to magnet 152 of selector 154.

The operation of the Fig. 3 system is as follows: When a normal, translucent button, having fully open eyes, intercepts the light which may be polarized in a vertical plane by screen 122, one portion of the light is diffused by the translucent material of the button and another portion of the light passes through the open eyes of the button and remains polarized in the plane of the first polarizer 122. Screen 136, which passes only light rays vibrating substantially at right angles to the plane at screen 122, which might be the horizontal plane, eliminates substantially all of the light passing through the open eyes of the button and passes only that portion of the light which has been so diffused by the translucent material of the button as to vibrate in a horizontal plane.

Thus, when a perfect button having fully open eyes intercepts the vertically polarized light, such light remains vertically polarized and will therefore be substantially eliminated by horizontally disposed polarizing screen 136 and thus will not excite photoelectric cell 144. Relay 148 is so adjusted as to not cause movement of selector 154 to its dotted-line position in such instance. However, if an eye or eyes of a button 124 be closed even by a thin web of flashing, a portion of the theretofore vertically polarized light from screen 122 will be diffused, and thus light passing through the flashing will have a substantial horizontal component, and therefore will be passed by horizontally disposed screen 136 and, in turn, will excite photoelectric cell 144. When photoelectric cell 144 is so excited, the current therefrom, through relay 148 and the conjunctive time-delay mechanism, causes movement of selector 154 so that, when the defective button has been dropped from disc 128, it will be guided into the appropriate channel for rejection.

Fig. 5 shows the left-hand portion of a system that, in all other respects, is similar to the Fig. 1 modification except that a spectral lamp 202 having a filament 204 connected by leads 214 to a source of current is used, and a band-pass color filter 215 is interposed between lamp 202 and collimating system 216. As in the prior examples, a polarizing screen 222 is interposed between collimating system 216 and disc 228. This system provides extra selectivity when used for inspecting colored buttons, as indicated by reference numerals 224. Preferably, the band-pass filter passes a color different from that of the button, as in the example shown wherein the button might be green and the filter transmitting only red light rays. Thus, a very thin web of green flashing in the eye of a button will additionally affect the amount of light ultimately impinging on the photoelectric cell, thereby permitting a higher degree of selection.

While examples of the methods and apparatus of the invention have been given above, it is not intended that the invention be limited thereby, except within the scope of the appended claims.

I claim:

1. A method of inspecting an edge of a translucent molded article, comprising the steps of projecting a beam of polarized light past said edge, intercepting said light by any imperfect portion of said article which may extend beyond said edge, whereby the polarized light passing through said portion is diffused, repolarizing the light transmitted past said edge and through said portion, and utilizing the repolarized light for affecting a comparison mechanism pre-set in accordance with the light transmitted past a substantially perfect edged article of the type being inspected and having no portions extending beyond said edge.

2. A method of inspecting openings in translucent moldings, including the steps of projecting a beam of polarized light through said opening, intercepting said light by any portion of said molding which may extend into said opening, whereby the polarized light passing through said portion is diffused, repolarizing the light transmitted through said opening and said portion, and utilizing the repolarized light for affecting a comparison mechanism pre-set in accordance with the light transmitted through the opening of a substantially perfect molding of the type being inspected and having no portions extending into its opening.

3. A method of inspecting openings in translucent molded articles, comprising the steps of projecting a beam of polarized light through said opening, intercepting said light by any portion of said article which may extend into said opening, whereby the polarized light passing through said portion is diffused, and employing the light remaining polarized after transmission through said opening for operating a comparison mechanism pre-set in accordance with the light remaining polarized after transmission through the opening in a perfect article of the type being inspected and having no portions extending into the opening.

4. A method of inspecting openings in translucent molded articles, comprising the steps of projecting a beam of monochromatic light through a polarizing medium, intercepting said light by any portion of said article which may extend into said opening, whereby the polarized light passing through said portion is diffused, filtering the light transmitted through said opening and said portion through a second polarizing medium, and utilizing the repolarized light for affecting a comparison mechanism pre-set in accordance with the light transmitted through the opening in a substantially perfect article having no portions extending into its opening.

5. A method of inspecting openings in translucent molded articles, comprising the steps of polarizing a beam of monochromatic light, disposing the opening in said article in said beam, intercepting said light by any portion of said article which may extend into said opening, whereby the polarized light passing through said portion is diffused, passing the light transmitted through said opening and by said portion through a polarizing screen having its plane of polarization similar to the plane of polarization of said light before interception, and utilizing the repolarized light for affecting a comparison mechanism pre-set in accordance with the light transmitted through the opening in a perfect article having no portions extending into its opening.

6. A method of inspecting openings in translucent molded articles, comprising the steps of polarizing a beam of monochromatic light, disposing the opening in said article in said beam, intercepting said light by any portion of said article which may extend into said opening, whereby the polarized light passing through said portion is diffused, passing the light transmitted through said opening and by said portion through a polarizing screen having its plane of polarization at right angles to the plane of polarization of said light before interception, and utilizing the repolarized light for affecting a comparison mechanism pre-set in accordance with the light transmitted through the opening in a perfect article having no portions extending into its opening.

7. A method of inspecting openings in translucent colored molded articles comprising the steps of passing a beam of light successively through a band-pass filter of a color other than that of the article being inspected and through a pair of polarizing screens to a photoelectric cell, interposing, successively, the articles being inspected between the polarizing screens so that their openings are in the beam of polarized light, whereby any portions of said articles which may extend into said openings intercept said polarized light and diffuse it after which said diffused light and the polarized light which has not been intercepted is repolarized by the second of said pair of polarizing screens and strikes said photoelectric cell, and utilizing the output of said photoelectric cell for affecting a comparison device pre-set in accordance with the output of said cell upon similar interposition of a perfect article having no portions extending into its opening.

8. A method of inspecting openings in translucent colored molded articles comprising the steps of passing a beam of light successively through a band-pass filter of a color other than that of the article being inspected and through a pair of polarizing screens to a photoelectric cell, interposing, successively, the articles being inspected between the polarizing screens so that their openings are in the beam of polarized light, whereby any portions of said articles which may extend into said openings intercept said polarized light and diffuse it after which said diffused light and the polarized light which has not been intercepted is repolarized by the second of said pair of polarizing screens and strikes said photoelectric cell, passing said articles to a selecting mechanism adapted to separate the perfect and imperfect articles, utilizing the output of said photoelectric cell for affecting a comparison device pre-set in accordance with the output of said cell upon similar interposition of a perfect article having no portions extending into its opening, and operating said selecting mechanism by the output of said comparison device.

9. A method of inspecting openings in translucent colored molded articles comprising the steps of passing a beam of light successively through a band-pass filter of a color other than that of the article being inspected and through a pair of polarizing screens to a photoelectric cell, interposing, successively, the articles being inspected between the polarizing screens so that their openings are in the beam of polarized light, whereby any portions of said articles which may extend into said openings intercept said polarized light and diffuse it after which said diffused light and the polarized light which has not been intercepted is repolarized by the second of said pair of polarizing screens and strikes said photoelectric cell, passing said articles to a selecting mechanism adapted to separate the perfect and imperfect articles, utilizing the output of said photoelectric cell for affecting a comparison and time delay device pre-set in accordance with the output of said cell upon similar interposition of a perfect article having no portions extending into its opening, and operating said selecting mechanism by the output of said comparison and time delay device.

10. In an apparatus for inspecting openings in buttons comprising button inspecting means and sorting mechanism for separating the perfect buttons from the imperfect, that improvement which resides in comprising said inspecting means of means for transmitting light, a photoelectric cell, a disc, means rotatably mounting said disc across the path of light from said light transmitting means to said cell, said disc having a plurality of apertures therethrough arranged in spaced relation to pass successively across said light path as the disc is rotated, means for supporting buttons to be inspected across said apertures with the openings in said buttons successively in the light path, a polarizing screen between the light transmitting means and said disc, whereby polarized light passes through the openings in said buttons and such polarized light as strikes an imperfection of a button extending into said opening is diffused, a second polarizing screen between said disc and said photoelectric cell to repolarize the diffused and transmitted light passing through a button opening, and a comparison device pre-set to the output of the photoelectric cell is affected by light passing through a perfect button opening, said comparison device being affected by the repolarized light from an imperfect opening of the button being inspected, said sorting means being controlled by said comparison device to eject imperfect buttons delivered thereto from said disc, said light transmitting means transmitting monochromatic light.

WILLIS ROBERT DRESSER.